United States Patent [19]

Williams

[11] Patent Number: 4,617,797

[45] Date of Patent: Oct. 21, 1986

[54] MULTI-FUNCTION VALVE

[75] Inventor: Keith R. Williams, Nevada, Iowa

[73] Assignee: Sundstrand Corporation, Rockford, Ill.

[21] Appl. No.: 610,085

[22] Filed: May 9, 1984

[51] Int. Cl.$^4$ .............................................. F16D 31/02
[52] U.S. Cl. ....................................... 60/444; 60/452; 417/217; 417/222
[58] Field of Search ...................... 417/217, 218, 222; 60/443, 444, 445, 452

[56] References Cited

U.S. PATENT DOCUMENTS

| 3,327,475 | 6/1967 | Clark et al. ............................... 60/52 |
| 3,554,214 | 1/1971 | Stenland ............................... 137/270 |
| 3,585,797 | 6/1971 | Moon .................................... 60/444 |
| 3,820,920 | 6/1974 | Klimaszewski et al. ........ 417/218 X |
| 3,908,519 | 9/1975 | Born et al. ....................... 417/217 X |
| 4,189,921 | 2/1980 | Knapp ................................. 60/452 X |
| 4,468,173 | 8/1984 | Dantlgraber ..................... 417/222 X |

OTHER PUBLICATIONS

Circuit Drawings of Series 20 and Series 30 Pump-Motor Transmissions of Sundstrand Corporation, published prior to May 9, 1983.

Primary Examiner—Edward K. Look
Attorney, Agent, or Firm—Wood, Dalton, Phillips, Mason & Rowe

[57] ABSTRACT

A multi-function valve usable in a hydrostatic transmission and having valve components mounted in a single valve body to provide pressure limiter and high pressure relief functions and with the structure also providing a bypass function and for supply of makeup fluid to the hydrostatic transmission. The multi-function valve has a charge check valve member and a relief valve member in associated relation and movable upon the occurrence of a predetermined pressure differential thereacross to perform control functions. One pressure differential results from a flow through an orifice and with the flow being controlled by a poppet valve member normally held closed by a heavy spring which establishes a system pressure at which the pressure limiter function will occur. With this structure, the pressure limiter function occurs in advance of the high pressure relief function and under the control of a single heavy spring. With two of the multi-function valves utilized with the hydrostatic transmission, various controls are operable with flow in either direction to the motor through pressure lines between the pump and motor defining a closed loop circuit.

15 Claims, 3 Drawing Figures

Fig. 1.

MULTI-FUNCTION VALVE

TECHNICAL FIELD

This invention pertains to a multi-function valve having particular utility in a hydrostatic transmission. A hydrostatic transmission has a pair of hydraulic displacement devices connected in a closed loop circuit, with one of the displacement devices normally operable as a pump and being of variable displacement. A pair of the multi-function valves are associated one with each of the pair of pressure lines interconnecting the displacement devices in the closed loop circuit to provide a number of previously known control functions. The multi-function valves provide a compact structure greatly reducing the number of drilled internal passages in a housing or external hoses as required for independent valves which achieve the various control functions.

BACKGROUND ART

Various controls for protecting a hydrostatic transmission from over-pressure are known. A hydrostatic transmission has a pair of hydraulic displacement devices connected in a closed loop circuit, with one of the displacement devices being of variable displacement and normally operating as a pump to supply fluid under pressure in a high pressure line side of the closed loop circuit to the other displacement device functioning as a motor. A low pressure line of the closed loop circuit directs fluid from the motor back to the pump. The controls for protecting the hydrostatic transmission from over-pressure have included pressure relief valves, pressure compensators and pressure limiters.

The high pressure relief valve cross-ports fluid from the high pressure line to the low pressure line to relieve the over-pressure condition. The high pressure relief valve reacts quickly, preventing excessive overshoot in the pressure in the high pressure line. However, there is unnecessary power consumption and wasted heat by the pumped flow being recirculated without use in operation of the motor.

The pressure compensator control, as typically used, limits a control pressure applied to servo means associated with the control of pump displacement when the system pressure in the high pressure line reaches a predetermined value. This limiting of control pressure for the servo means results in a reduction of pump stroke and the resulting limiting of system pressure. The pressure compensator results in less power consumption and heat generation than the high pressure relief valve control, but is inherently slow due to the required destroking of the pump. This results in significant system over-pressure under transient conditions where a load is applied quickly to the hydrostatic transmission.

The pressure limiter control utilizes a pilot valve which senses system pressure in the high pressure line and, when that pressure exceeds a predetermined value, the pilot valve opens and ports fluid to the servo means for destroking the pump. The destroking of the pump results in a reduction of the volume of fluid being pumped and a limiting of the system pressure and, thereby, minimizes power consumption and heat generation. The pressure limiter does not have the fast response of the high pressure relief valve, but is an improvement over the older pressure compensator control, due to the fact that high pressure fluid in the high pressure line is used to destroke the pump and the destroking occurs more rapidly.

It is known to use both high pressure relief valves and pressure limiters in the same hydrostatic transmission to overcome the problems inherent in use of only one or the other of such controls. However, such use of high pressure relief valves and pressure limiters has presented another difficulty due to the two controls being separate and the settings of the controls are subject to variations due to manufacturing practices and degradation from use. Normally, the setting of the pressure limiter is at a value lower than the setting of the high pressure relief valve, so that the pressure limiter will first function upon system pressure reaching a predetermined value and, if the pressure goes to a certain value higher, the high pressure relief valve will then operate. With the use of separate controls, the settings of the two control devices must be separated sufficiently to assure that the high pressure relief valve will not operate before the pressure limiter. The invention disclosed herein combines the high pressure relief valve and the pressure limiter valve into one valve assembly, resulting in a high pressure relief valve whose setting cannot go below that of the pressure limiter valve.

A hydrostatic transmission has a charge pump for supplying make-up fluid to the closed loop circuit through charge check valves which open when charge pressure exceeds the pressure in the low pressure line of the hydrostatic transmission. It is also known to utilize a bypass valve with the hydrostatic transmission which cross-connects the two pressure lines of the closed circuit when a device, such as a vehicle utilizing the hydrostatic transmission in the drive for the vehicle, is being towed and the displacement device normally operating as a motor is functioning as a pump. These additional functions have normally been accomplished by valves independently positioned in the circuitry associated with the hydrostatic transmission. A multi-function valve embodying the invention disclosed herein incorporates these valve mechanisms into the same valve body which has the high pressure relief valve and the pressure limiter, resulting in a valve that replaces several independent valves and which are independently mounted to result in a reduction of passageways in an end cap of the variable displacement device and an elimination of external manifolds, hoses and pressure compensator control housings.

Valve structures are available which incorporate components for performing plural control functions in association with a hydrostatic transmission. One of these valve structures provides high pressure relief as well as a charge check valve and adjustable mechanism provides the bypass function. This valve structure does not combine the functions of high pressure relief and pressure limiter control. Another available valve assembly has the charge check valve and the high pressure relief valve incorporated into the same structure, but does not provide structure functioning as a pressure limiter, nor does the structure provide the bypass function.

DISCLOSURE OF THE INVENTION

A feature of the invention is to provide a multi-function valve which incorporates a number of valve functions into a single valve body to provide improved control functions and which is more reliable in operation and which reduces the over-all manufacturing costs by the reduction in passageways, hoses, and housings required when the control functions are performed by independent valves.

Another feature of the invention is to provide a multi-function valve having valve components providing for a pressure limiter function and a high pressure relief function, wherein the two controls are associated in a series relation which assures that the pressure limiter control will function to destroke the pump of the hydrostatic transmission prior to operation of the high pressure relief valve structure which cross-connects the high pressure and low pressure lines of the closed loop circuit of the hydrostatic transmission.

Another feature of the invention is to associate with the multi-function valve structure as defined in the preceding paragraph a charge pressure check valve structure and enable a bypass function to cross-connect the two pressure lines of the closed loop circuit when the motor of the hydrostatic transmission is functioning as a pump.

Still another feature of the invention is to provide new and improved structure for accomplishing the bypass function including adjustable mechanism and which can be adjusted without creating a leakage problem.

In carrying out the foregoing features of the invention, the hydrostatic transmission has a pair of hydraulic displacement devices connected in a closed loop circuit with two parallel pressure lines and with one of the displacement devices being of variable displacement and normally functioning as a pump and the other displacement device functioning as a motor and a pair of the valve structures as referred to in the foregoing features are associated with the hydrostatic transmission. The pair of valve structures are interconnected by a charge pressure passage whereby charge pressure can be directed to the low pressure line of the closed loop circuit of the hydrostatic transmission and this same passage is used in the high pressure relief function to cross-connect the high and low pressure lines.

The multi-function valve incorporates a pressure limiter valve member normally closed to block flow from one side of the closed loop circuit to servo means for controlling the displacement of the variable displacement device. A relatively heavy spring biases the pressure limiter valve member closed against system pressure and when system pressure exceeds a predetermined value the pressure limiter valve member opens to direct system pressure to the servo control means for destroking the variable displacement device. A high pressure relief valve member opens in response to a predetermined pressure differential resulting from flow to the servo means of the variable displacement device for cross-connecting the two pressure lines of the hydrostatic transmission. Thus, the two valve members are in series and the pressure limiter function must occur prior to the high pressure relief function.

The bypass function is achieved by removing the bias on the pressure limiter valve member referred to in the preceding paragraph whereby the high pressure relief valve member is free to move when a pressure differential resulting from flow through the pressure limiter valve member creates a pressure differential adequate to overcome a relatively light spring associated with the high pressure relief valve member. Upon movement, pressure in one pressure line of the hydrostatic transmission can be applied through the charge pressure passage referred to above to the charge check valve of the other valve structure to open the latter and crossconnect the pressure lines of the hydrostatic transmission. An important feature of this bypass function resides in the use of the flow through the open pressure limiter valve to the servo means associated with the variable displacement device to enable the bypass function. Thus upon initiation of the bypass function, the variable displacement device, if in stroke, is destroked. The bypass function is commonly used when a vehicle having the hydrostatic transmission used in drive of the vehicle is towed and, if the variable displacement device has not been set in neutral prior to towing but is still in a stroke position, the towing of the vehicle in the bypass function will cause the variable displacement device to destroke and the pump and prime mover will not rotate.

An object of the invention is to provide a hydrostatic transmission having a pair of hydraulic displacement units connected in a closed loop circuit and with one of the units having variable displacement comprising, pressure limiter means including a pressure limiter valve member and responsive to a predetermined pressure in the closed loop circuit for reducing the displacement of the variable displacement unit, means including a relief valve member providing high pressure relief for said closed loop circuit at a pressure in said closed loop circuit which exceeds said predetermined pressure, and said valve members being structurally related to require operation of said pressure limiter valve member before said relief valve member can operate.

Another object of the invention is to provide a multi-function valve usable in a hydrostatic transmission having a pair of hydraulic displacement units connected in a closed loop circuit with one of the units being of variable displacement comprising, a valve body with a bore and a pair of valve seats, a charge check valve having a poppet valve member associated with one valve seat to block flow between said bore and a first port, a relief valve having a hollow relief valve spool movably positioned within said poppet valve member and having an end wall abutting a transverse wall of said poppet valve member, a first spring acting on said relief valve spool to urge said valve members into abutting relation and the poppet valve member against its valve seat, said poppet valve member having a passage in the transverse wall thereof communicating with said first port, said relief valve spool end wall having an orifice opening to said first port through said transverse wall passage, a charge pressure port in said valve body opening to said bore, passage means in the wall of said poppet valve member connecting the interior of said poppet valve member with the bore exteriorly of the poppet valve member, said relief valve spool blocking said passage means when the valve members are in abutting relation, a pressure limiter port, passage means connecting the interior of the hollow relief valve spool with the pressure limiter port, a second poppet valve member exposed to pressure in said interior coacting with a poppet seat to close said last-mentioned passage means, and a second spring urging the last-mentioned poppet valve member onto its poppet seat.

BEST MODE FOR CARRYING OUT THE INVENTION

Figure 1:
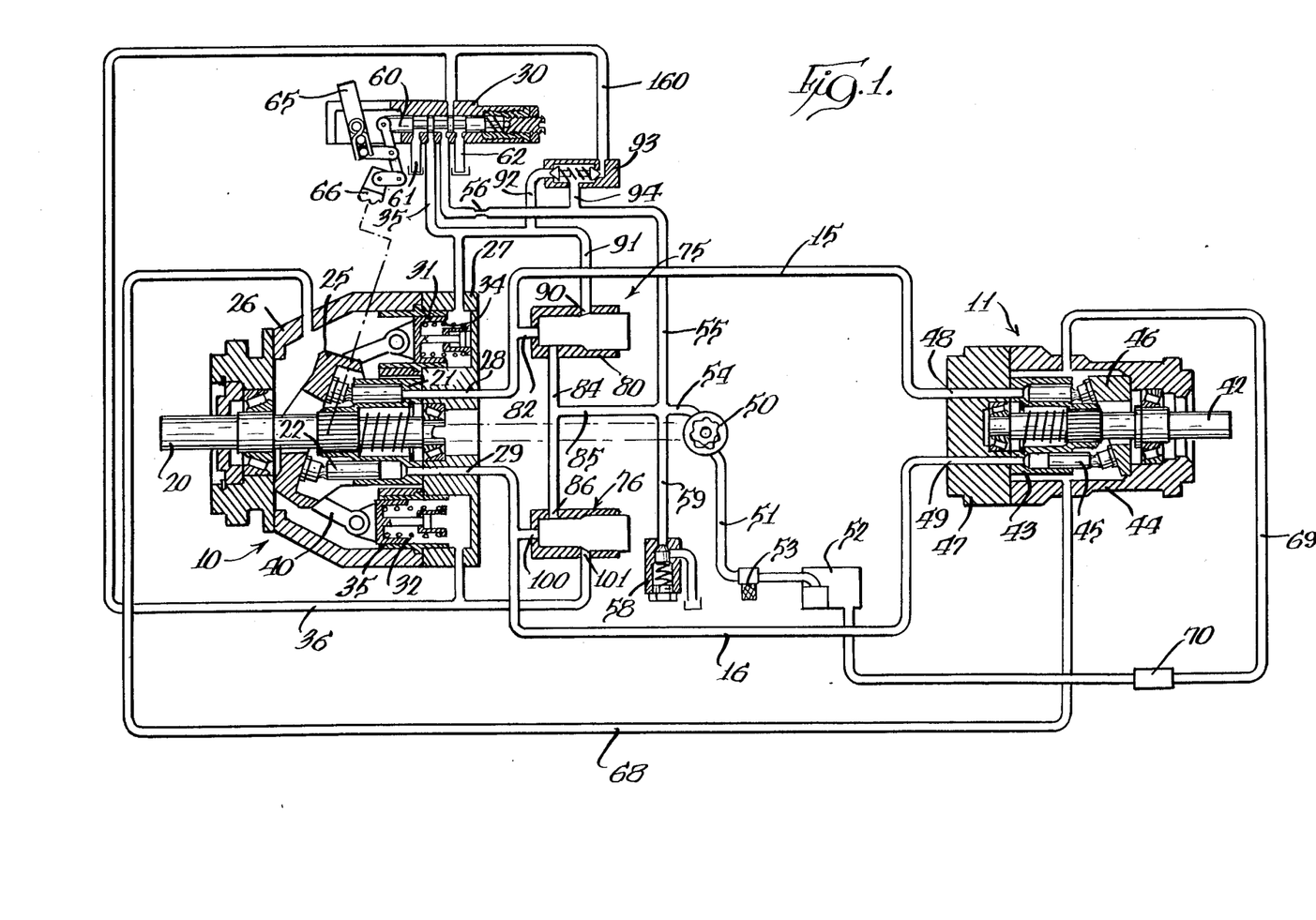
FIG. 1 is a hydraulic circuit diagram of a hydrostatic transmission utilizing a pair of the multifunction valves of the present invention.

A typical hydrostatic transmission is shown in FIG. 1 wherein a pair of hydraulic displacement devices, indicated generally at 10 and 11, are connected in a closed loop circuit by a pair of pressure lines 15 and 16 which can be hoses or passages in a housing for the displacement devices. The hydraulic displacement device 10 is an axial piston unit and, in normal operation, functions as a pump to deliver fluid under pressure to the displacement device 11 which normally functions as a motor. In one mode of operation, the pressure line 16 is a high pressure line and the pressure line 15 is a low pressure line and, in another mode of operation, the pressure conditions in the two pressure lines are reversed.

The hydraulic displacement device 10 is shown as an axial piston unit having an input shaft 20 connected to a rotatable cylinder block 21. The cylinder block has axially-extending bores, each of which mounts a movable piston 22 and with the stroke of the pistons being under the control of a reversible swashplate 25. This structure is housed in a housing 26 having an end cap 27 having ports 28 and 29 which connect with pressure lines 15 and 16, respectively, and a valve plate associated with the axially-extending bores in the cylinder block 21. The swashplate 25 is adjustable to provide variable displacement for the hydraulic displacement device 10 which, hereinafter, will be referred to as a pump. The position of the swashplate is controlled by servo means including a displacement control valve, indicated generally at 30, and a pair of servo cylinders 31 and 32 which are connected to the displacement control valve 30 through the lines 35 and 36, respectively. The construction of the pump 10 is well known in the art and with the servo cylinders 31 and 32 each housing a movable piston 34 and 35, respectively, which is urged outwardly of the associated servo cylinder by a spring associated therewith.

The swashplate 25 is positioned in one maximum displacement position, as shown in FIG. 1, as the result of charge pressure acting through the displacement control valve in the servo cylinder 32 against the piston 35 which is connected through a link 40 associated with the swashplate. The swashplate 25 has a destroked neutral position wherein the pistons 22 are not stroked by the swashplate and also has a maximum displacement position at the opposite side of neutral from the position of the swashplate shown in FIG. 1. The opposite maximum displacement position results from pressure acting on the piston 34 in the servo cylinder 31. There can be intermediate displacement positions either side of the neutral destroked position and which is less than the full stroke position, as shown in FIG. 1.

The hydraulic displacement device 11 functions generally as a motor and will hereinafter be referred to as a motor. The motor has an output shaft 42 splined to a cylinder block 43 rotatable in a housing 44 and with the cylinder block having a series of axially-extending bores, each of which receive a movable piston 45 which is associated with a fixed swashplate 46. An end cap 47 has ports 48 and 49 associated with the pressure lines 15 and 16, respectively, whereby fluid flowing from the pump through one of the pressure lines can be directed through a valve plate to the piston chambers for causing rotation of the cylinder block and the output shaft 42. With the swashplate 25 of the pump 10 positioned as shown in FIG. 1, the output shaft 42 will rotate in one direction and when the swashplate is positioned the other side of neutral, the output shaft 42 will rotate in the opposite direction and with the pressure lines 15 and 16 alternately being high pressure and low pressure lines in these alternate modes of operation.

A charge pump 50, as well known in the art, supplies make-up fluid to the closed loop circuit and also supplies charge pressure for control functions. The charge pump has an inlet connected through a line 51 to a reservoir 52, with a filter 53 in the line. The charge pump has an outlet connected by lines 54 and 55 to the displacement control valve 30, with the line 55 having an orifice 56. A charge pressure relief valve 58 connects to the outlet of the charge pump 50 through a line 59 and functions to limit charge pressure.

The displacement control valve 30 has a housing in which a valve member 60 can be positioned to control communication of full or partial charge pressure with one or the other of the pump servo cylinders 31 and 32 and with the other servo cylinder being connected to the reservoir. The connections to reservoir are through lines 61 and 62, each of which have a flow-restricting orifice therein.

The valve member 60 can be positioned through a linkage operated either manually by a handle 65 or by other suitable means and with the linkage including a feedback connection from the swashplate 25 through an arm 66 which is partially shown in FIG. 1 and with a broken line extension thereof to the swashplate.

A line 68 interconnects the interiors of the pump 10 and the motor 11 whereby the interiors are connected to the reservoir 52 through a line 69 extending from the motor to the reservoir and having a heat exchanger 70 therein.

The foregoing description describes the well-known basic components of a hydrostatic transmission utilizing a variable displacement pump and wherein the angle of the swashplate 25 can be varied to either side of a neutral destroked position. The use of charge check valves whereby the charge pump 50 can supply make-up fluid to the pressure line 15 or 16 which is at low pressure and which is conventional in a hydrostatic transmission has not yet been described because of the charge check valves being incorporated in the multi-function valve to be described.

Various types of controls can be associated with a hydrostatic transmission, including pressure controls as previously discussed and the multi-function valve to be described provides a pressure limiter function and a high pressure relief function as well as having valve structure incorporated therein providing the charge check valve function. Also, the multi-function valve is constructed to enable bypass operation wherein the pressure lines 15 and 16 are cross-connected when the motor 11 is operating as a pump and the destroking of the pump occurs as part of the bypass operation.

There are a pair of the multi-function valves. A first multi-function valve, indicated generally at 75, is associated with the pressure line 15 and a second multi-function valve 76 is associated with the pressure line 16. Each of these multi-function valves 75 and 76 is of the same construction and the multi-function valve 75 is shown particularly in FIG. 2. A valve body 80, which may be part of the end cap 27, has a first port 81 which is an inlet port connected by a passage 82 optionally in the end cap) to the pressure line 15. A charge pressure port 83 connects to a charge pressure passage 84 which connects with the charge pump 50 through a line 85 and which also connects to a similar port 86 in the multi-function valve 76. A servo port 90 is connected by a line 91 to the servo line 35 extending between the displacement control valve 30 and the servo cylinder 31. A branch line 92 connects the line 91 to a pressure limiter check valve structure 93 having a spring-loaded check valve acting against pressure in branch line 92 and openable to permit flow to a line 94 connected to the charge pressure line 95 whereby there is an upper limit on the pressure in line 91.

The multi-function valve 76, which may also be in end cap 27, has a first port 100 corresponding to the inlet port 81 which connects to the pressure line 16 and a servo port 101 which connects to the servo line 36 associated with the servo cylinder 32.

With the swashplate 25 in a fully-stroked position, as shown in FIG. 1, the pressure line 15 is the high pressure line and the pressure line 16 is the low pressure line and the multi-function valve 75 is the valve operative to provide pressure control functions in the hydrostatic transmission. When the pressure condition in the pressure lines 15 and 16 is reversed, the multi-function valve 76 is the valve operative to control pressure conditions.

In the subsequent description, the multi-function valve will be described in detail and it will be understood that the structure of the multi-function valve 76 is the same and the functions thereof are the same when pressure line 16 is the high pressure line.

Figure 2:
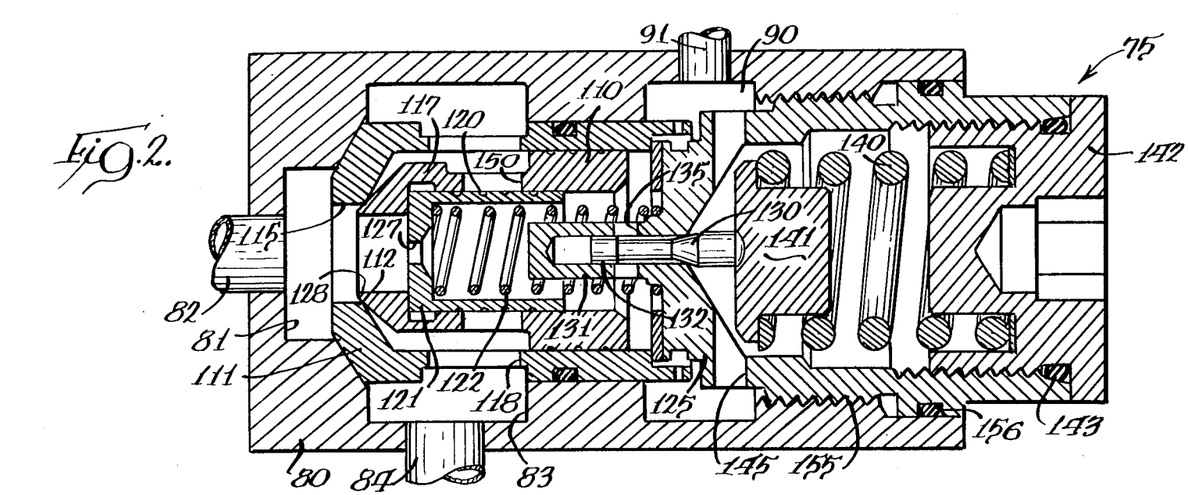
FIG. 2 is a longitudinal sectional view of a first embodiment of the multi-function valve of the invention.

The multi-function valve 75 has a charge check valve member 110 in the form of a tubular poppet movable within a sleeve 111 fitted in the valve body and which has a valve seat 112 formed thereon. An end wall of the tubular sleeve has an opening 115 aligned with the inlet port 81. The charge check valve member 110 is urged to a closed position on the valve seat 112 by a spring to be described, whereby communication between ports 81 and 83 is blocked. The charge check valve member 110 has a major diameter section which slidably mounts the valve member in the sleeve 111 and a reduced diameter section 117, both of which are subject to pressure in the charge pressure passage 84 by communication through openings 118 in the sleeve 111. The charge check valve member 110 can move to the right away from the valve seat 112 and place the charge pressure passage 84 in communication with the inlet port 81 whereby fluid flows from the charge pressure passage 84 to the passage 82.

The charge check valve member 110 is hollow to define a chamber which receives a relief valve member 120, in the form of a spool having an end wall 121 which abuts the interior of a transverse wall of the charge check valve member and with the valve members being urged into abutting relation by a light spring 122 positioned between the end wall 121 of the relief valve spool 120 and a valve seat member 125. The end wall 121 of the relief valve spool 120 has an orifice 127 aligned with an opening 128 in the transverse wall of the charge check valve member and with the opening 115 in the sleeve 111 whereby the occurrence of flow through the orifice 127 creates a flow-induced pressure differential across the end wall of the relief valve spool and a force acting in opposition to the spring 122.

The interior of the relief valve spool 120 is always filled with oil, with there being a flow condition when the interior is open to communication with the port 90.

This communication is controlled by a pilot valve having a poppet valve member 130 coacting with the valve seat member 125. The valve seat member 125 has a cylindrical extension 131 having a bore which receives a stem portion of the pilot poppet valve member 130 and which has a piston 132 loosely fitted therein and which merely functions as a loose-fitting damper piston which permits equal pressure on both sides of the piston in a static condition. When the pilot poppet valve member 130 is in a dynamic condition, the motion produces a pressure differential across the piston 132 which tends to stabilize the movement. The interior of the relief valve member 120 communicates with the interior of the cylindrical extension 131 of the valve seat member through ports 135 of the latter, whereby pressure existing within the interior of the relief valve member acts on the poppet valve member 130. The poppet valve member 130 is biased to a closed position against its valve seat by a heavy spring 140 and, in comparison, the spring 122, previously referred to, is a light spring. The spring 140 acts between a spring seat 141 engaging an end of the pilot poppet stem and an end cap 142 which is threadedly engaged with an outer end of the valve seat member 125 and sealed relative thereto by a seal member 143. When the poppet valve member 130 opens, fluid flows to lateral passages 145 in the valve seat member 125 which communicate with the port 90 and the passage 91.

Additional structural features of the multi-function valve include lateral passages 150 formed in the charge check valve member which selectively connect the interior of the charge check valve member with the port 83 and the charge pressure passage 84. The valve seat member 125 is threaded into an open end of the valve body 80 at 155 and a seal member 156 provides a seal therebetween.

The bias force of the strong spring 140 acting on the poppet valve member 130 determines the system pressure at which a pressure limiter function will commence to limit the pressure in the high pressure line 15 by destroking the pump. This pressure is sensed at the pilot poppet valve member 130 by communication through the passage 82 and port 81, the openings in the sleeve 111 and the charge check valve member 117 and the orifice 127 in the relief valve member 120. This pressure exists within the interior of the relief valve member and acts through the openings 135 to urge the poppet valve member 130 open. When the pressure overcomes the force of the spring 140, the poppet valve member 130 opens, whereby fluid can flow to the passage 91 and to the servo line 35 whereby pressure is applied at the servo cylinder 31 to move the swashplate 25 toward a destroked position.

As the pump is destroked by movement of the swashplate 25, fluid is displaced from the servo cylinder 32 which flows through the servo line 36 to the displacement control valve 30. Since the flow path through the displacement control valve 30 is restricted by the charge pressure passage orifice 56, there is also flow to the pressure limiter check valve 93 through a line 160 whereby fluid can be expelled rapidly from the servo cylinder 32 to allow rapid destroking of the pump. The servo line 35, which is receiving pressure flow from the multi-function valve 75, is connected to the reservoir through an orifice associated with line 61 and the flow through the orifice results in an increase of pressure in the servo cylinder 31.

The high pressure relief valve function is coordinated with the pressure limiter valve function by using the poppet valve member 130 as a pilot valve for the relief valve member 120. With there being flow through the orifice 127 during the pressure limiter function, there is a flow through the orifice 127. This flow creates a pressure differential acting to move the relief valve member to the right against the relatively light spring 122. The movement of the relief valve member 120 eventually opens the high pressure line 15 to the charge pressure passage 84 through transverse openings 150 in the charge check valve member which has not moved. The sizing of the orifice 127 with respect to the size of the relief valve member 120, the force of the spring 122, and flow requirements for the pressure limiter function to the port 90 determine the coordination between the pressure limiter function and the relief valve function. In an embodiment of the control, the pressure limiter function requires a flow of less than 1 gpm and the orifice 127 is sized to open the relief valve member 120 to the charge pressure passage 84 at a flow of about 1.5 gpm or 200–300 psi above the pressure limiter setting as set by the spring 140. Any degradation in the setting of the pressure limiter due to wear or contamination will also automatically reduce the high pressure relief valve setting by the same amount since the valve members for the two functions are arranged in series.

The completion of the high pressure relief function is achieved by flow from the high pressure line 15 to the low pressure line 16 by use of the multi-function valve 76. When high pressure is delivered to the charge pressure passage 84, it communicates with the corresponding port 83 in the multi-function valve 76 whereby a pressure differential acting on the charge check valve member 117, as described hereinafter in connection with its conventional function, causes the latter valve member to open and fluid can flow to the low pressure line 16. The previously mentioned charge pressure relief valve 58 protects the charge circuit from excessive charge pressure in this operation.

Referring to FIG. 1, if the swashplate 25 is in an opposite maximum stroke position from that shown, pressure line 16 is the high pressure line and the multi-function valve 76 is subject to pressure in the pressure line 16 and controls the pressure limiter and high pressure relief functions. When the pressure in pressure line 16 exceeds that established by the force of the heavy spring 140, the poppet valve member 130 thereof opens to permit flow to servo line 36 with pressure acting in the servo cylinder 32 to urge the swashplate 25 to a neutral position. When the flow through the orifice 127 of the relief valve member is adequate to create a certain pressure differential, the latter valve member opens to the charge pressure passage 84 and the charge check valve member 110 of the multi-function valve 75 opens to permit flow from pressure line 16 to the low pressure line 15.

The charge check valve member 117 performs the conventional function of supplying make-up fluid to the low pressure side of the closed loop circuit. The spring 122 is designed to keep the charge check valve member 117 closed until charge pressure is approximately, in one embodiment, 15–20 psi higher than pressure in the low pressure line. In further describing this operation in connection with the multi-function valve 75, it will be noted that the charge check function occurs when the pressure line 15 is the low pressure line. The charge check function is accomplished by having the pressure in the interior of the relief valve spool 120 at the same pressure as the low pressure in the pressure line 15 by communication through the orifice 127. When a predetermined pressure differential between low side loop pressure and charge pressure occurs, with the latter being higher, the pressure acting on the sections 110 and 117 of the charge check valve member causes the valve member to open by movement to the right, as shown in FIG. 2, against the action of spring 122. When the pressure in the pressure line 15 exceeds charge pressure, this pressure, acting within the interior of the relief valve spool 120, functions to maintain the charge check valve closed.

The bypass function cross-connects the two pressure lines of the closed loop circuit. This function is utilized when the hydrostatic transmission is used in the drive of a vehicle and the vehicle is being towed. When this occurs, the motor 11 functions as a pump and the pump 10 functions as a motor.

In the multi-function valve of FIG. 2, the bypass function is achieved by unscrewing the end cap 142 a relatively few turns to relieve the bias of the heavy spring 140, placing the poppet valve member 130 in a neutral position. This places the interior of the relief valve member 120 in communication with the port 90 and passage 91 leading to the servo cylinder 31 to permit flow through the orifice 127 and with the previously mentioned flow therethrough creating a pressure differential sufficient to open the relief valve member 120 against the light spring 122. As a result, fluid can flow through the openings 150 to the charge pressure passage 84 and act on the charge check valve member of the other multi-function valve to permit flow to the other pressure line of the closed loop circuit. This general function is known in the art. However, an improvement provided by the multi-function valve resides in the fact that the relief valve member 120 is permitted to open only by flow through the orifice 127 which flows to the passage 91 and, therefore, fluid flows to a servo cylinder to destroke the pump 10, if the pump had not been previously placed in neutral. This is a desirable result since, during towing, the pump and the vehicle engine which normally drives the pump are not rotated.

Figure 3:
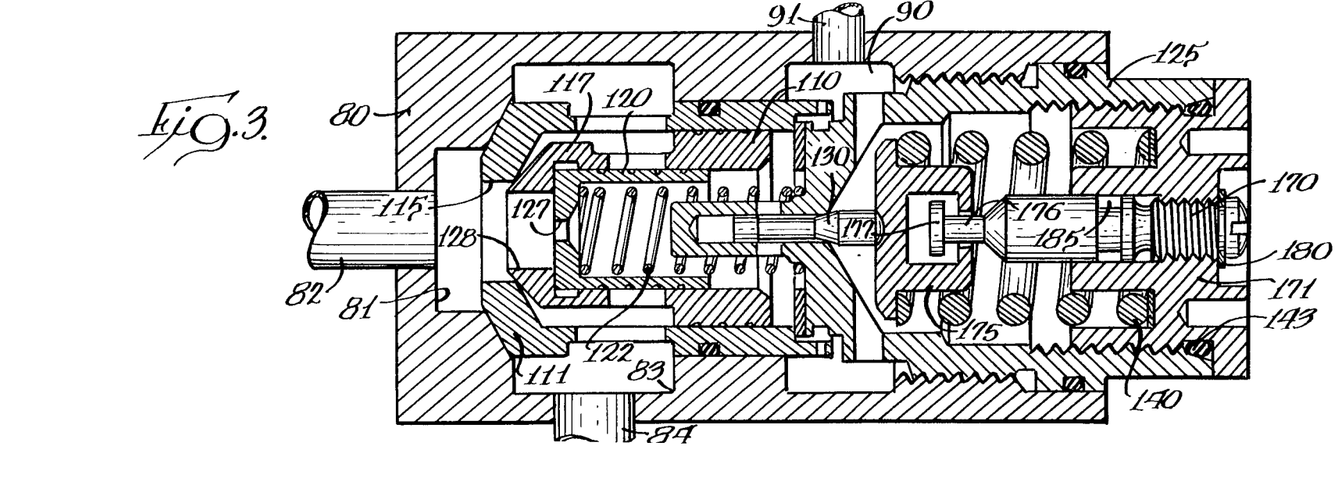
FIG. 3 is a longitudinal sectional view of a second embodiment of said valve.

A modification of the multi-function valve is shown in FIG. 3 wherein the construction is the same except for the structure operable to achieve the bypass function. In the multi-function valve of FIG. 3, the parts which are the same as those shown in FIG. 2 have been given the same reference numeral.

In the embodiment of FIG. 3, the bias of the heavy spring 140 is released by structure including a screw 170 threaded into an end cap 171 threaded into the valve seat member 125. A spring seat 175 loosely receives a reduced diameter section 176 of the screw 170 and the end thereof has an enlarged flange 177 which, in normal operation, is spaced from the walls of an interior opening in the spring seat 175 to define a lost-motion connection. This permits the spring seat 175 to move freely, without restraint by the screw 170 during normal operation. A retaining ring 180 prevents the screw 170 from being threaded into the end cap 171 so far as to prevent free movement of the spring seat 175. When the bypass function is desired, the screw 170 is rotated several turns to cause the flange 177 to move to the right and engage a wall of the interior chamber of the spring seat and move the spring seat to the right to compress the heavy spring 140 and, at the same time, disengage the contact between the spring seat 175 and the poppet valve member stem. When the bypass function occurs, the pressure lines in the closed loop circuit are cross-connected and the pump is destroked if necessary.

The embodiment shown in FIG. 3 avoids problems that might occur in connection with the structure shown in FIG. 2. There is fluid in the chamber within the valve seat member 125 housing the heavy spring 140 and this chamber is sealed by the seal member 143. In FIG. 2, when the cap 142 is backed out, the seal is broken and its capacity to seal is reduced, depending on the extent of backing-out of the cap and, therefore, a slow leak can occur. An additional problem results if the cap 142 is screwed out too far, which could result in disassembly of the structure associated with the poppet valve member 130. The leakage would increase and parts could be lost or improperly reassembled by persons unfamiliar with the valve assembly. These problems are avoided by the structure shown in the embodiment of FIG. 3 wherein the cavity housing the heavy spring 140 is always sealed, since the screw 170 is always sealed by a seal member 185.

With the multi-function valve disclosed herein, a number of control functions for a hydrostatic transmission can be accomplished by use of two similar valve packages with resulting reduction in flow connections as provided by hoses or housing passages. Although both pressure limiter and high pressure relief functions are known in connection with the control of hydrostatic transmissions, the multi-function valve functions to place these two operations in a series relation whereby both functions are under the control of a single spring and the pressure limiting function must always occur in advance of the high pressure relief function. The bypass function is also previously known. However, the multi-function valve disclosed herein performs this function in a new manner to assure also that the pump is de-stroked, if not in neutral, during a bypass operation.

I claim:

1. A hydrostatic transmission having a pair of hydraulic displacement units connected in a closed loop circuit and with one of the units having variable displacement comprising, pressure limiter means including a pressure limiter valve member and reponsive to a predetermined pressure in the closed loop circuit for reducing the displacement of the variable displacement unit, means including a relief valve member providing high pressure relief for said closed loop circuit at a pressure in said closed loop circuit which exceeds said predetermined pressure, said valve members being structurally related to required operation of said pressure limiter valve member before said relief valve member can operate, a calve body mounting said valve members and having an inlet port connected to said closed loop circuit and a pair of outlet ports, said pressure limiter valve member functioning as a pilot valve for said relief valve member and having a closed position against pressure at the inlet port to block the inlet port from one of the outlet ports, said relief valve member having a closed position against pressure at the inlet port to block the inlet port from the other of said outlet ports, a first heavy spring urging the pressure limiter valve closed, a second light spring urging the relief valve member closed, passage means exposing the pressure limiter valve member to the pressure at the inlet port whereby said predeterminded pressure overcomes the force of the first heavy spring to open the pressure limiter valve member and including an orifice to establish a flow-induced pressure differential across the relief valve member when the pressure limiter valve member opens whereby said relief valve member opens when the flow-induced pressure differential exceeds the force of said second light spring, and means to neutralized the pressure limiter valve member whereby said flow-induced pressure differential can operate said relief valve member without said predetermined pressure existing in said closed circuit.

2. A hydrostatic transmission defined in claim 1 wherein the pressure limiter valve member is neutralized by adjustable means acting on the first spring to remove the force of said first spring acting on the pressure limiter valve member.

3. A hydrostatic transmission having a pair of hydraulic displacement units connected in a closed loop circuit and with one of the units having variable displacement comprising, pressure limiter means including a pressure limiter valve member and responsive to a predetermined pressure in the closed loop circuit for reducing the displacement of the variable displacement unit, means including a relief valve member providing high pressure relief for said closed loop circuit at a pressure in said closed loop circuit which exceeds said predetermined pressure, said valve members being structurally related to require operation of said pressure limiter valve member before said relief valve member can operate, a valve body mounting said valve members and having an inleg port connected to said closed loop circuit and a pair of outlet ports, said pressure limiter valve member functioning as a pilot valve for said relief valve member and having a closed position against pressure at the inlet port to block the inlet port from one of the outlet ports, said relief valve member having a closed position against pressure at the inlet port to block the inlet port from the other of said outlet ports, a first heavy spring urging the pressure limiter valve closed, a second light spring urging the relief valve member closed, passage means exposing the pressure limiter valve member to the pressure at the inlet port whereby said predetermined pressure overcomes the force of the first heavy spring to open the pressure limiter valve member and including an orifice to establish a flow-induced pressure differential across the relief valve member when the pressure limiter valve member opens wherby said relief valve member opens when the flow-induced pressure differential exceeds the force of said second light spring, and a charge check valve member having a normally closed position to block flow between the inlet port and said other outlet port, said second spring urging the charge check valve member to said closed position, and said charge check valve member having at least one area exposed to pressure in said other outlet port acting against said second spring.

4. A hydrostatic transmisbion as defined in claim 3 wherein said charge check valve member is a tubular poppet valve with passage means in a side wall thereof, and said relief valve member is a spool mounted in said charge check valve member, said second spring engaging the relief valve member and urging the latter into abutting relation with the charge check valve member whereby both of the last-mentioned valve members can move together against the action of the second spring and the relief valve member can also move independently.

5. A hydrostatic transmission having a pair of hydraulic displacement units connected in a closed loop circuit by a pair of pressure lines and one of said displacement units having variable displacement and servo means associated therewith to set the displacement comprising: a pair of multi-function valve assemblies associated one with each pressure line and each having a charge pressure port connected to a common charge pressure passage; and each valve assembly having an inlet port communicating with one of the pressure lines and a servo port communicating with a servo cylinder of said servo means, a high pressure relief valve for blocking communication between the charge pressure port and the inlet port, a spring urging the high pressure relief valve closed, orifice means associated with the high pressure relief valve to establish a pressure differential to act against said spring and open the high pressure relief valve, and pressure limiter valve means for controlling flow between the inlet and servo ports and through said orifice, said pressure limiter valve means including a spring holding the latter valve means closed and which acts against pressure existing at said inlet port whereby a predetermined pressure will open said pressure limiter valve means to cause flow to said servo cylinder and enable a predetermined flow-induced pressure differential across the orifice to open the high pressure relief valve and connect said charge pressure and inlet ports.

6. A hydrostatic transmission as defined in claim 5 wherein each multi-function valve assembly includes a charge check valve member blocking communication between said charge pressure and inlet ports and urged to a closed position by said first-mentioned spring, said charge check valve member having at least one area exposed to pressure in said charge pressure passage to exert a force opposing said first-mentioned spring.

7. A hydrostatic transmission as defined in claim 5 including means for deactivating said pressure limiter valve spring whereby pressure is not required to open the pressure limiter valve means and there can be flow from the inlet port to the servo port and a flow-induced pressure differential across the high pressure relief valve resulting from flow to the servo port which is equal to said predetermined pressure differential causes said high pressure relief valve to open to connect said inlet port to the charge pressure port.

8. A hydrostatic transmission as defined in claim 7 wherein said spring deactivating means comprises a member threaded into a valve body and against which an end of the pressure limiter valve spring is seated, said member being rotatable to relieve the bias on said last-mentioned spring.

9. A hydrostatic transmission as defined in claim 7 wherein said spring deactivating means includes an end cap threaded into a valve body and a spring seat spaced therefrom with said pressure limiter valve spring positioned therebetween, a screw threaded in said end cap and coacting with said spring seat through a lost-motion connection which permits movement of the spring seat relative to the screw, seal means associated with said screw, and means for limiting the advance of the screw relative to said end cap to assure said relative movement between the screw and spring seat during normal operation.

10. A hydrostatic transmission having a pair of hydraulic displacement units connected in a closed loop circuit by a pair of pressure lines and one of said displacement units having variable displacement and servo means associated therewith to set the displacement comprising: a pair of multi-function valve assemblies associated one with each pressure line and each having a charge pressure port connected to a common charge pressure passage; and each valve assembly having an inlet port communicating with one of the pressure lines, a servo port communicating with said servo means, a high pressure relief valve for blocking communication between the charge pressure port and the inlet port, means associated with the high pressure relief valve and responsive to a pressure differential resulting from flow to said servo port to open the high pressure relief valve, and pressure limiter valve means for controlling flow between the inlet and servo ports, said pressure limiter valve means including a spring holding the latter valve means closed, and a predetermined pressure existing at said inlet port opening said pressure limiter valve means to cause flow to said servo port and to said servo means.

11. A hydrostatic transmission as defined in claim 10 wherein each multi-function valve assembly includes a charge check valve member blocking communication between said charge pressure and inlet ports, and said charge check valve member having areas exposed to pressure in said charge pressure passage whereby the charge check valve member is urged toward open position.

12. A hydrostatic transmission as defined in claim 10 including means for deactivating said spring whereby pressure is not required to open the pressure limiter valve means and there can be flow from the inlet port to the servo port and a pressure differential across the high pressure relief valve resulting from flow to the servo port which causes said high pressure relief valve to open to connect said inlet port to the charge pressure port.

13. A hydrostatic transmission as defined in claim 12 wherein said spring deactivating means includes an end cap threaded into a valve body and a spring seat spaced therefrom with said spring positioned therebetween, a screw threaded in said end cap and coacting with said spring seat through a lost-motion connection which permits movement of the spring seat relative to the screw, and seal means associated with said screw.

14. A hydrostatic transmission having a pair of hydraulic displacement units connected in a closed loop circuit by a pair of pressure lines and one of said displacement units having variable displacement and servo means associated therewith to set the displacement comprising: a multi-function valve assembly associated with one pressure line and having a plurality of ports including a first port, an inlet port communicating with said one pressure line and a servo port communicating with said servo means, a high pressure relief valve for blocking communication between the first port and the inlet port, a first spring urging the high pressure relief valve closed, orifice means associated with the high pressure relief valve to establish a pressure differential to act against said first spring and open the high pressure relief valve, said high pressure relief valve having a normally closed relief valve member movable within a chamber and an end of said chamber communicating with the downstream side of said orifice means, and pressure limiter valve means for controlling flow between the inlet and servo ports and through said orifice means, said pressure limiter valve means including a pressure limiter valve member in series between said servo port and said chamber end and a second spring holding the pressure limiter valve member closed and which acts against pressure existing at said inlet port as sensed through the orifice means whereby a predetermined pressure will open said pressure limiter valve means to permit flow from said chamber end and through said orifice means to said servo means and enable a predetermined flow-induced pressure differential across the orifice means to act against the first spring and open the high pressure relief valve and connect said first port and said inlet port.

15. A hydrostatic transmission as defined in claim 14 wherein said first spring is a relatively light spring and said second spring is a heavier spring.

* * * * *